United States Patent [19]
Shimizu et al.

[11] Patent Number: 5,699,955
[45] Date of Patent: Dec. 23, 1997

[54] METHOD OF BONDING TI-ALLOY MEMBERS

[75] Inventors: Takao Shimizu, Nagoya; Hirotsugu Horio, Tokai, both of Japan

[73] Assignee: Daido Steel Co., Ltd., Nagoya, Japan

[21] Appl. No.: 646,483

[22] Filed: May 8, 1996

[30] Foreign Application Priority Data

Aug. 30, 1995 [JP] Japan .................. 7-222333

[51] Int. Cl.$^6$ .................................. B23K 13/01
[52] U.S. Cl. ............... 228/194; 228/262.71; 148/526; 219/617
[58] Field of Search .................. 228/193, 194, 228/195, 157, 262.71; 148/669, 526; 219/617

[56] References Cited

U.S. PATENT DOCUMENTS

| | | | |
|---|---|---|---|
| 3,957,194 | 5/1976 | Woodward | 228/194 |
| 4,043,498 | 8/1977 | Conn, Jr. | 228/193 |
| 5,226,982 | 7/1993 | Eylon | 228/262.71 |

*Primary Examiner*—Samuel M. Heinrich
*Attorney, Agent, or Firm*—Kubovcik & Kubovcik

[57] ABSTRACT

A method of firmly jointing Ti-alloy members of various shapes such as pipes and rods by solid diffusion bonding. The members are butted and heated under pressure in a non-oxidizing atmosphere, while a Ti-layer is disposed at the interface of butting by either (1) inserting a sheet for bonding made of Ti having a thickness of 500 μm or less between the butted faces, or (2) previously forming a Ti-layer for bonding having a thickness of 1 μm or more on at least one of the butted faces by any method such as vapor deposition.

25 Claims, 4 Drawing Sheets

METHOD OF BONDING TI-ALLOY MEMBERS

BACKGROUND OF THE INVENTION

The present invention concerns a method of bonding various Ti-alloy members.

Steel tubes have been conventionally used in various use such as petroleum pipelines laid on the sea bottoms. In order to lighten burden of maintenance by ensuring corrosion resistance for a long period it is considered to use Ti-alloy tubes which have better corrosion resistance. To connect the Ti-alloy tubes into a long, continued pipeline welding is necessary, and TIG welding has been practiced for this purpose. Welding of Ti-alloy, however, takes a long time for operation and it is difficult to ensure the quality of the welded parts. Thus, it has been demanded improved technology of bonding Ti-alloy members.

We have made research on the method of bonding Ti-alloy tubes and established a technology for bonding them. The method comprises interposing an intermediate member made of a metal having a melting point lower than that of the base metal or the Ti-alloy of the members, or previously forming bonding layers with a low melting point metal at the end of the tubes to be bonded, butting the ends of the members, and heating the butted faces to a temperature higher than the melting point of the low melting point metal but lower than the melting point of the base metal of the members, while applying pressure to the butted faces. This technology has been already disclosed (Japanese Patent Application No.07-150779).

The above technology is based on the mechanism of preventing coarsening of crystal grains of Ti-alloy base metal at a temperature higher than $\alpha$-$\beta$ transformation temperature by doping a small amount of such a component or components as selected from the group of S, Se, Te, REM and Ca, and by utilizing fine inclusion particles formed by these components as nuclei for crystal grain formation.

This technology facilitated bonding of Ti-alloy tubes. If, however, conventional Ti-alloy members containing no such particular components as mentioned above can be bonded by a simple method with high reliability, use of Ti-alloy tubes will become more easy.

SUMMARY OF THE INVENTION

The object of the present invention is, in view of the above circumstances, to provide a method of bonding Ti-alloy members using conventional Ti-alloy members, in which the properties at the bonded parts are not affected by bonding, with simple procedures.

DETAILED EXPLANATION OF THE PREFERRED EMBODIMENTS

Figure 1:
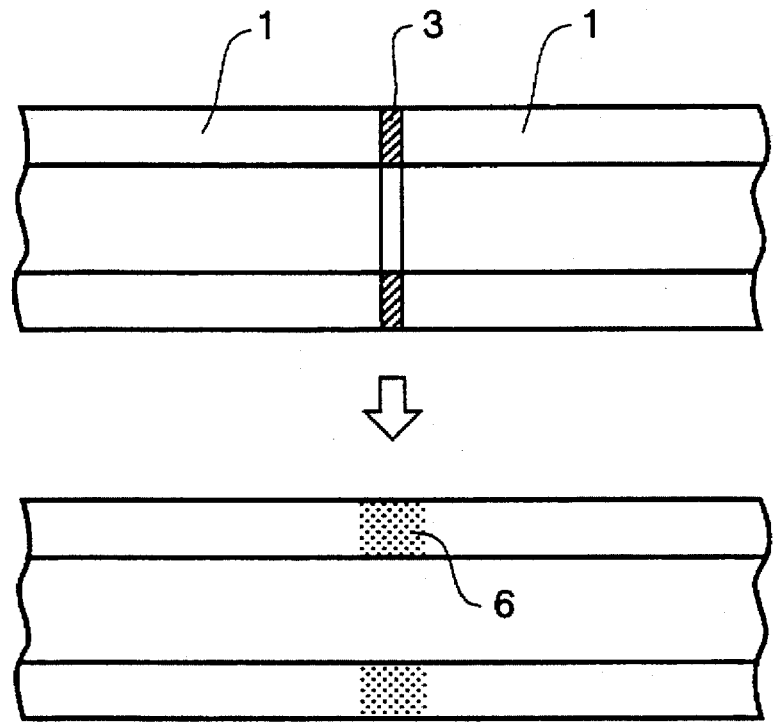
FIG. 1 illustrates longitudinal section views to explain the first embodiment of the present method of bonding; the upper part illustrating the step of butting Ti-alloy pipes to be bonded with insertion of Ti-sheet for bonding, and the lower part illustrating the step after completion of bonding.

An embodiment of the method of bonding Ti-alloy members according to the present invention comprises, as illustrated in FIG. 1, butting two Ti-alloy members to be bonded, in the illustrated example, Ti-alloy tubes (1), with insertion of a Ti-sheet (3) of thickness 500 µm or less between the butted faces of the members; heating the butted faces to a high temperature near but lower than the transformation temperature of the Ti-alloy, in a non-oxidizing atmosphere, while applying pressure of 5 MPa or higher to the butted faces; and holding the members for a period of 3 minutes or longer.

Figure 2:
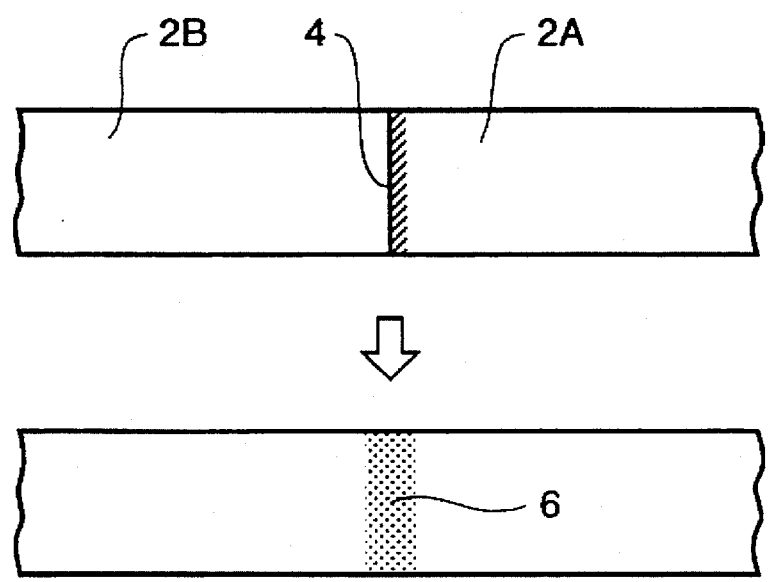
FIG. 2 illustrates longitudinal section views to explain the second embodiment of the present method of bonding; like FIG. 1, the upper part illustrating the step of butting Ti-alloy rods to be bonded, one of which has a Ti-layer for bonding formed on an end and the other has no such layer; and the lower part illustrating the step after completion of bonding.

Another embodiment of the method of bonding Ti-alloy members according to the present invention comprises, as illustrated in FIG. 2, forming a Ti-layer (4) of a thickness of 1 µm or more at least one of the two ends of the two Ti-alloy members to be bonded, in the illustrated example, Ti-alloy rods (2A, 2B); butting the faces of the two members; heating the butted faces to a high temperature near but lower than the transformation temperature of the Ti-alloy, in a non-oxidizing atmosphere, while applying pressure of 5 MPa or higher to the butted faces; and holding the members for a period of 3 minutes or longer.

Figure 3:
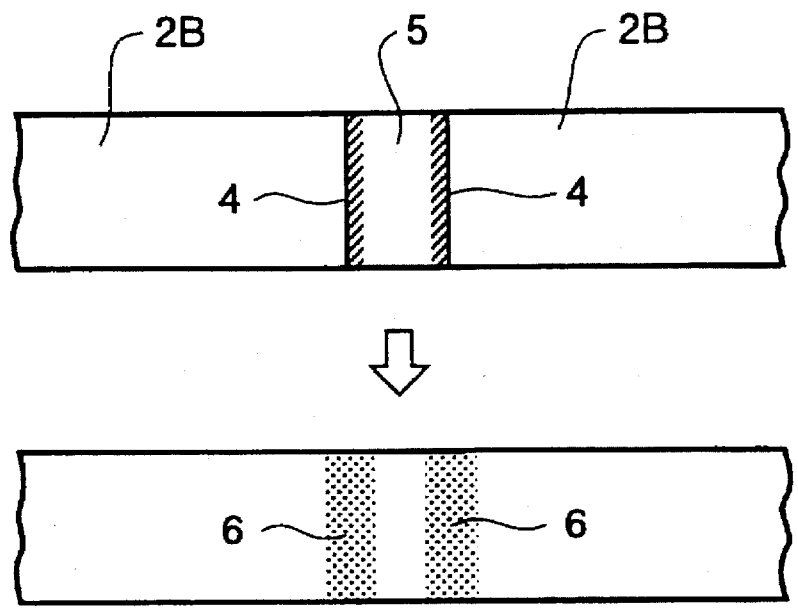
FIG. 3 illustrates longitudinal section views to explain the third embodiment of the present method of bonding; like FIGS. 1 and 2, the upper part illustrating the step of butting two Ti-alloy rods to be bonded with the aid of an intermediate member which has Ti-layers for bonding formed on both the end thereof; and the lower part illustrating the step after completion of bonding.

A further embodiment of the method of bonding Ti-alloy member according to the present invention, which is considered to be the most practical, comprises: as illustrated in FIG. 3, butting two Ti-alloy members to be bonded, in the illustrated example, also two Ti-alloy rods (2B), with insertion of an intermediate member (5) having Ti-layers (4) of a thickness of 1 µm or more between the butted faces of the two members to be bonded; heating the butted faces to a high temperature near but lower than the transformation temperature of the Ti-alloy, in a non-oxidizing atmosphere, while applying pressure of 5 MPa or higher to the butted faces; and holding the members for a period of 3 minutes or longer.

Figure 4:
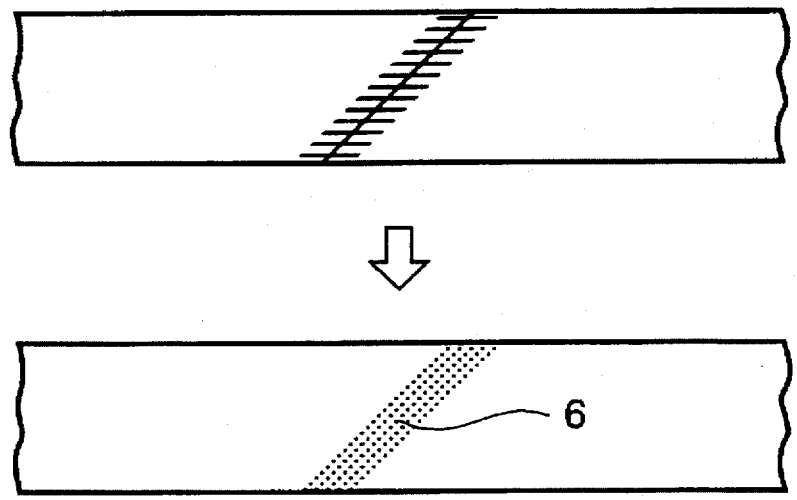
FIG. 4 illustrates longitudinal section views to explain modified embodiments of the present method of bonding in which the butting faces are not rectangular to the direction of pressure; like FIGS. 1 to 3, the upper part illustrating the step of butting two Ti-alloy members to be bonded having Ti-layers for bonding formed on the ends thereof; and the lower part illustrating the step after completion of bonding.

In any of the above described embodiments it is of course convenient that the butted faces of the Ti-alloy members are in a direction rectangular to the direction of applying pressure to the butted faces. However, in cases where no strict axial concordance of the members is required or where a suitable guiding means such as a ceramic tube can be used, it is possible to use inclined butting faces. FIG. 4 illustrates such alternative embodiments.

There can be various patterns in butting the ends of the members to be bonded. Typical ones are illustrated together in FIG. 6. Each of the patterns may have the above noted embodiment of inclined butting faces.

The Ti-alloy members which can be bonded by the present method may be made of any Ti-alloy unless it has such a low transformation temperature that it takes not practical, long period of time for having Ti-atoms diffused to the extent that achieves bonding of the members. To be concrete, the Ti-alloys generally have the alloy composition containing one or more additive elements selected from the group I below and the balance being substantially Ti: I) 30% or less of one or more of Al up to 10%, V up to 25%, Sn up to 15%, Co up to 10%, Cu up to 10%, Ta up to 15%, Mn up to 10%, Hf up to 10%, W up to 10%, Si up to 0.5%, Nb up to 20%, Zr up to 10%, Mo up to 15% and O up to 0.1% (in case of two or more are added, in total)

Heating the alloy to a high temperature causes coarsening of crystal grains. In order to prevent this it is recommended to add elements selected from group II below so that the formed fine inclusion particles may prevent crystal growth: II) a combination of 10% or less of one or more (in case of two or more are used, in total) of S 0.1–10%, Se 0.01–10% and Te 0.01–10%; and one or two of REM 0.01–10% and Ca 0.01–10% (in case of two are used, up to 10% in total).

Among the conventional Ti-alloys representative ones which are suitable for applying the present method are listed below with the transformation temperatures thereof:

| Ti-Alloy | Transformation Temp. (°C.) |
| --- | --- |
| Ti—6Al—4V | 995 |
| Ti—3Al—2V | 920 |
| Ti—6Al—6V—2Sn | 945 |
| Ti—5Al—2Cr—1Fe | 970 |

The non-oxidizing atmosphere surrounding the members to be bonded means an atmosphere in which oxidation of Ti and Ti-alloy does not substantially proceeds at the heating temperature and changes in alloy properties may not occur. Such an atmosphere may be an inert gas atmosphere in which $O_2$ and $N_2$ contents being both up to 0.01 vol. % at a normal or around normal pressure, or a vacuum under a pressure of $10^{-4}$ Torr or lower.

Any means can be used for heating the butted faces to be bonded. It may be heat radiation in an electric furnace or energizing by electric current. If the conditions for the atmosphere permit, even a high temperature gas may be used. In general, high frequency induction is suitable. Induction heating can be said to be the most suitable means, because it is convenient to heat the members in the form of rods and tubes, it is possible to achieve a high temperature in a short period of time, and it is easy to control temperature of the heated members.

Suitable frequency of high frequency electric power for induction heating is usually 200 kHz or lower. A higher frequency is, because of well known skin effect, not suitable for heating rods or thick tubes. On the other hand, too low a frequency takes too long time until the temperature goes high. In many cases such a low frequency as 10 kHz or so will be suitable.

Figure 5:
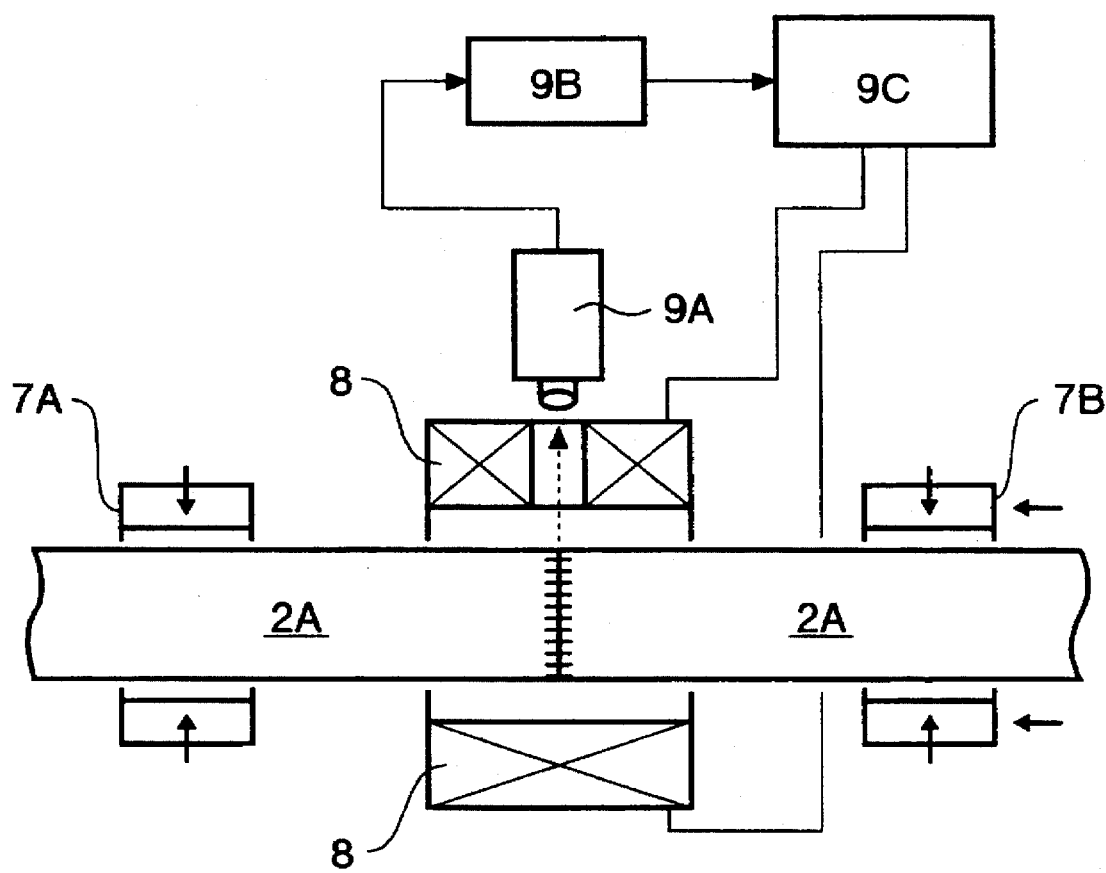
FIG. 5 is a drawing to explain the structure of an apparatus suitable for practicing the present method.

In case where the induction heating is used, it is recommended, as illustrated in FIG. 5, to carry out high frequency induction heating by measuring the temperature of the heated parts with a radiation thermometer (9A) which is installed through a coil (8) for induction heating, transmitting the data of the measured temperature to a controller (9B) for controlling the high-frequency electric power supplied from a power generator (9C) to coil (8) so as to promptly achieve the desired temperature and to maintain the achieved temperature. In FIG. 5, numerical reference (7A) indicates a fixed chack, (7B) a movable chack, which work together to hold the Ti-alloy rods (2A) under pressure.

In the embodiment shown in FIG. 1, two Ti-alloy tubes (1) are butted with insertion of a Ti-sheet (3) for bonding between the ends of the two tubes, and the butted faces to be bonded are heated under pressure. Ti-atoms in the Ti-sheet diffuse into the faces at both sides of the Ti-alloy tubes, and bonding by solid phase diffusion is thus established. Numerical reference (6) indicates the diffusion bonded layer thus formed. No structural changes will occur in the base metal material if the temperature is lower than the transformation temperature of the alloy. The period of time "at least three minutes" was determined from the view that bonding by diffusion may sufficiently proceed if the temperature is so high as near the transformation temperature. Also, the pressure limitation of "at least 5 MPa" will give conditions for bonding by diffusion of Ti-atoms in the Ti-sheet into the Ti-alloy members.

Limitation of the thickness "up to 500 μm" of the Ti-sheets was determined from the view to prevent remaining of Ti-layer having a substantial thickness at the joint part when the bonding was achieved by the above described mechanism. Needless to say, pure Ti is a metal softer than Ti-alloys, and therefore, if a pure Ti-layer or a layer consisting substantially of Ti exists at the joint part, them the joint part will be a weak point for the bonded body. Thus, it is preferable to diffuse Ti-atoms so thoroughly into Ti-alloy members that no Ti-layer may remain. Thickness of the Ti-sheet of several micrometers may be sufficient for bonding. However, because handling of a very thin foil is generally difficult, it is convenient to use a sheet of suitable thickness in the limitation up to 500 μm. Practically, it is often suitable to use a sheet of thickness in the range of 10–20 μm.

As may be understood from the above explanation, in the cases where Ti-sheet is not used and, in place thereof, Ti-alloy members having a Ti-layer or layers formed at least one end of the members are used, the mechanism of bonding is the same as that described above. Formation of the Ti-layer may be carried out by any means selected from vapor deposition, spattering and ion plating. In these embodiments, contrarily to the cases of using Ti-sheets, it is disadvantageous to use thicker Ti-layers, because too long period of time should be spent for forming the Ti-layer, and therefore, it is desired to use a Ti-layer as thin as possible. By finishing the end faces of the Ti-alloy members to be bonded as smooth as possible, thickness of the Ti-layer necessary for bonding may be thinner. However, in cases where finishing of the end faces to be bonded is carried out by a conventional technique, Ti-layers of a thickness less than 1 μm may be not sufficient to ensure diffusion of Ti-atoms over the whole butted faces. Practically, a thickness of 2 μm or more up to 5 μm is suitable, and a thickness higher than 10 μm is not necessary.

The third embodiment of the present invention where an intermediate member having Ti-layers at both the end thereof is used can be said to combine merits of the above two embodiments. In other words, this is the easiest way of practice, because it is no longer necessary to use very thin foils, which are difficult to handle, and at the same time, troublesome procedure of forming Ti-layers at the end of long members is eliminated.

The present invention makes it possible to apply a method of diffusion bonding to various Ti-alloy members such as pipes made of conventional Ti-alloys with simple steps and high reliability. The method of bonding of the present invention will be particularly worthwhile when applied to the situation where tubes are to be bonded one by one at working fields, for instance, riser tubes for working petroleum wells.

EXAMPLES

In the following examples, those with an asterisk are control examples.

Example 1

Figure 6:
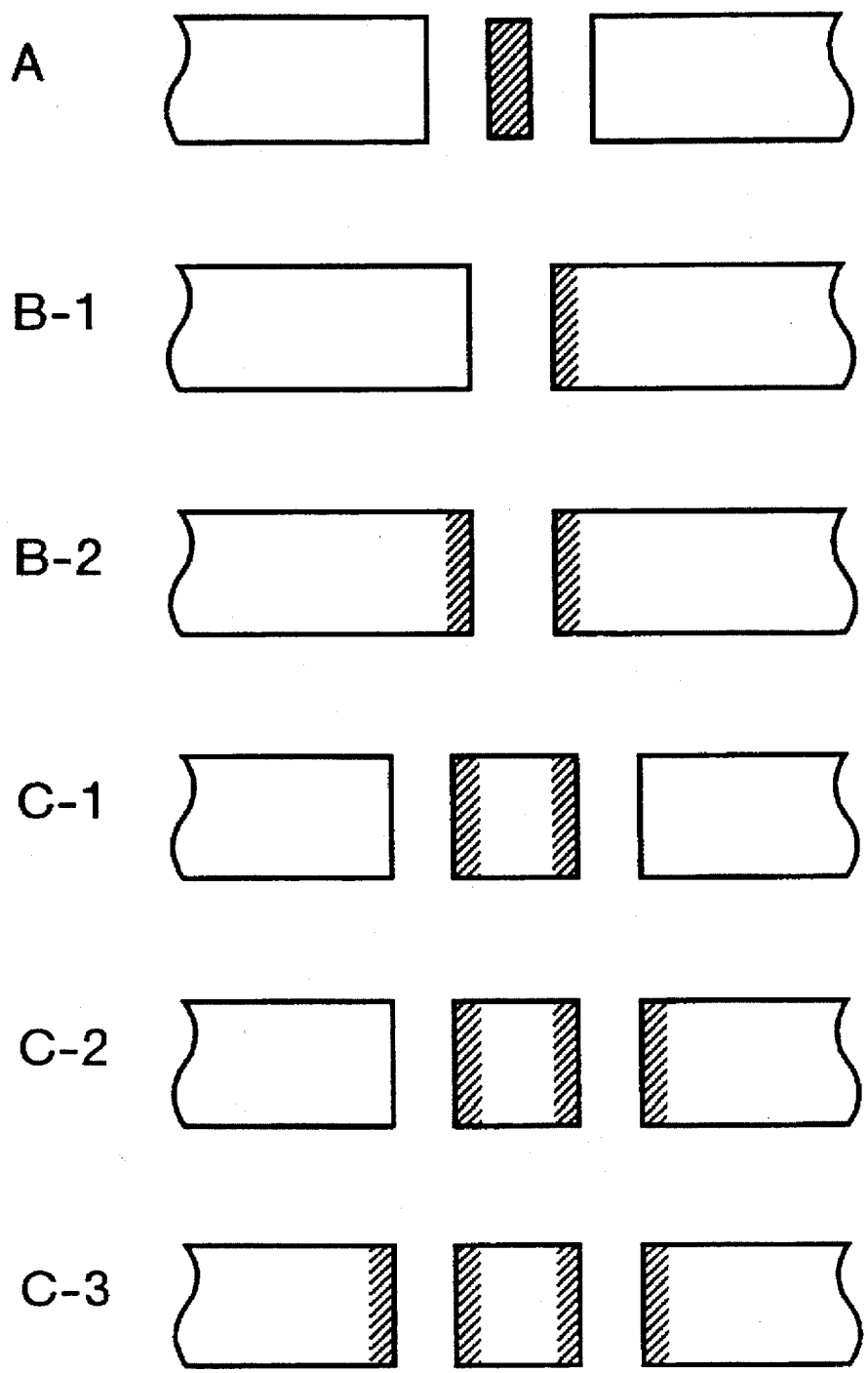
FIG. 6 is a drawing to illustrate the butting patterns to be employed in the present bonding method.

Bonding of butting pattern "A" in FIG. 6, i.e., butting with an insertion of a pure Ti-sheet for bonding, was carried out. The Ti-alloy members bonded are tubes of outer diameter 100 mm and thickness 10 mm made of Ti-6Al-4V. The Ti-sheets are that of "grade 1" of JIS H4600 for Nos. 1, 3 and 4, and "grade 2" for No. 2. Heating was done in a high-frequency induction furnace.

After being cooled the bonded products were subjected to tensile tests and bending tests to measure joint part strength ratio (ratio of strength at joint part/strength of base member, hereinafter referred to as "strength ratio") and the breaking points were recorded.

The operation conditions and the test results are shown together in Table 1

TABLE 1

|  | No. 1 | No. 2 | No. 3* | No. 4* |
|---|---|---|---|---|
| Ti-sheet (μm) | 500 | 100 | 0# | 1000 |
| Temperature (°C.) | 950 | 950 | 950 | 950 |
| Frequency (kHz) | 3 | 3 | 3 | 3 |
| Atmosphere | Ar | He | Ar | Ar |
| $N_2$ (vol. %) | 0.005 | 0.005 | 0.005 | 0.005 |
| $O_2$ (vol. %) | 0.005 | 0.005 | 0.005 | 0.005 |
| Pressure (MPa) | 5 | 10 | 10 | 10 |
| Period (min.) | 3 | 5 | 5 | 5 |
| Tensile Strength Ratio | 1.0 | 1.0 | 0.5 | 0.8 |
| Breaking Point | mother member | mother member | joint interface | in Ti-sheet |
| Bending Strength Ratio | 1.0 | 1.0 | 0.2 | 0.8 |
| Breaking Point | no | no | joint interface | joint part | direct butting of pipes

No.3*, in which no Ti-sheet for bonding was used, failed to obtain the merits of the present invention. No.4* showed a lower strength at the joint part, because a too thick Ti-sheet remained at the joint part.

Example 2

The same operation as that of Example 1 was repeated, provided that the materials of the pipe were replaced with Ti-3Al-2V in No.5, and Ti-6Al-6V-2Sn in Nos.6, 7 and 8*. The operation conditions and the test results are shown in Table 2.

TABLE 2

|  | No. 5 | No. 6 | No. 7 | No. 8* |
|---|---|---|---|---|
| Ti-sheet (μm) | 100 | 100 | 100 | 100 |
| Temperature (°C.) | 910 | 900 | 920 | 920 |
| Frequency (kHz) | 3 | 3 | 200 | 400 |
| Atmosphere | Ar | Ar | Vacuum ($10^{-4}$Torr) | |
| $N_2$ (vol. %) | 0.008 | 0.006 | — | — |
| $O_2$ (vol. %) | 0.007 | 0.004 | — | — |
| Pressure (MPa) | 10 | 10 | 5 | 10 |
| Period (min.) | 5 | 5 | 3 | 5 |
| Tensile Strength Ratio | 1.0 | 1.0 | 1.0 | 0.8 |
| Breaking Point | mother member | mother member | mother member | joint part |
| Bending Strength Ratio | 1.0 | 1.0 | 1.0 | 0.4 |
| Breaking Point | no | no | no | joint part |

The data of No.8* show that the frequency of the high frequency electric power was so high that heating was not extended to whole the butted faces.

Example 3

Bonding of butting pattern "A" was carried out using a tube furnace as the means for heating. The materials for the pipes are: Ti-6Al-4V for No.9 and Nos.11* to 13*; and Ti-5Al-2Cr-1Fe for No.10 and No.14*. Ti-sheets were made of Ti of JIS "grade-3" for No.9, and "grade-1" for all the other runs. The operating conditions and the test results are shown in Table 3.

TABLE 3

|  | No. 9 | No. 10 | No. 11* | No. 12* | No. 13* | No. 14* |
|---|---|---|---|---|---|---|
| Ti sheet (μm) | 20 | 100 | 20 | 20 | 20 | 100 |
| Temperature (°C.) | 990 | 950 | 1050 | 950 | 950 | 950 |
| Atmosphere | Vacuum | Ar | Vacuum | Vacuum | Vacuum | Ar |
| $N_2$ (vol. %) | — | 0.01 | — | — | — | 0.01 |
| $O_2$ (vol. %) | — | 0.01 | — | — | — | 0.10 |
| Pressure (MPa) | 15 | 10 | 10 | 10 | 3 | 10 |
| Period (min.) | 4 | 5 | 5 | 2.5 | 5 | 5 |
| Tensile Strength Ratio | 1.0 | 1.0 | 1.0 | 0.8 | 0.6 | 1.0 |
| Breaking Point | mother member | mother member | mother member | joint part | joint part | mother member |
| Bending Strength Ratio | 1.0 | 1.0 | 0.9 | 0.8 | 0.5 | 0.7 |
| Breaking Point | no | no | joint part | joint part | joint part | joint part |

In No.11*, because of too high heating temperature crystal grains grew, and as the result joint part became brittle. Both of No.12* (due to a shorter holding time) and No.13* (due to a lower pressure) suffered from insufficient bonding. In No.14*, oxidation occurred because of a large amount of $O_2$ in the atmosphere, and therefore, bonding was dissatisfactory,

Example 4

Bonding of butting pattern "B-1" was carried out. The Ti-alloy members were made by forming Ti-6Al-4V into round rods of diameter 20 mm, and a Ti-layer was formed at each one ends of the members by ion plating. Heating was done by high frequency induction. The operating conditions and the test results are shown in Table 4.

TABLE 4

|  | No. 15 | No. 16* |
|---|---|---|
| Ti-layer (μm) | 0.5 | 1 |
| Temperature (°C.) | 950 | 950 |
| Frequency (kHz) | 25 | 25 |
| Atmosphere | Ar | Ar |
| $N_2$ (vol. %) | 0.005 | 0.005 |
| $O_2$ (vol. %) | 0.005 | 0.005 |
| Pressure (MPa) | 10 | 10 |
| Period (min.) | 4 | 4 |
| Tensile Strength Ratio | 1.0 | 0.7 |
| Breaking Point | mother member | joint part |
| Bending Strength Ratio | 1.0 | 0.4 |
| Breaking Point | no | joint part |

In No.16*, because of insufficient thickness of Ti-layer, diffusion bonding was dissatisfactory.

Example 5

Bonding of butting pattern "B-2" was carried out. Ti-alloy members were also round rods of diameter 20 mm made of Ti-6Al-4V. Heating was done by high frequency induction at 25 kHz. The operating conditions and the test results are shown in Table 5.

TABLE 5

|  | No. 17 | No. 18 | No. 19* | No. 20* | No. 21* |
|---|---|---|---|---|---|
| Ti-layer (μm) | 5 | 10 | 5 | 5 | 5 |
| Method of Forming | Spattering | Vapor Deposition | Ion Plating | | |
| Temperature (°C.) | 950 | 950 | 1050 | 950 | 950 |
| Atmosphere | Ar | He | Ar | Ar | Ar |
| $N_2$ (vol. %) | 0.005 | 0.003 | 0.008 | 0.008 | 0.008 |
| $O_2$ (vol. %) | 0.005 | 0.006 | 0.007 | 0.007 | 0.007 |
| Pressure (MPa) | 5 | 15 | 10 | 10 | 3 |
| Period (min.) | 3 | 5 | 5 | 2.5 | 5 |
| Tensile Strength Ratio | 1.0 | 1.0 | 1.0 | 0.8 | 0.6 |
| Breaking Point | mother member | mother member | mother member | joint part | joint part |
| Bending Strength Ratio | 1.0 | 1.0 | 0.8 | 0.6 | 0.4 |
| Breaking Point | no | no | joint part | joint part | joint part |

In No.19*, due to high temperature, in No.20*, due to short holding time, and in No.21*, due to low pressure, bonding was dissatisfactory.

Example 6

Bonding of butting pattern "C-1" was carried out. The material used is Ti-3Al-2V for all the runs except for No.23* in which Ti-6Al-4V was used. All the members were round rods of diameter 20 mm. Bonding was done by high frequency induction heating under vacuum ($10^{-4}$ Torr). The operating conditions and the test results are shown in Table 6.

TABLE 6

|  | No. 22 | No. 23 | No. 24* | No. 25* | No. 26* | No. 27* |
|---|---|---|---|---|---|---|
| Ti-layer (μm) | 1 | 5 | 0.5 | 10 | 5 | 5 |
| Method of Forming | Spattering | Ion Plating | Spattering | Vapor Deposition | Ion Plating | |
| Temperature (°C.) | 900 | 920 | 900 | 1000 | 900 | 900 |
| Frequency (kHz) | 3 | 100 | 3 | 3 | 3 | 3 |
| Pressure (MPa) | 5 | 10 | 10 | 10 | 10 | 3 |
| Period (min.) | 3 | 4 | 5 | 4 | 2.5 | 5 |
| Tensile Strength Ratio | 1.0 | 1.0 | 0.7 | 1.0 | 0.8 | 0.6 |
| Breaking Point | mother member | mother member | joint part | mother member | joint part | joint part |
| Bending Strength Ratio | 1.0 | 1.0 | 0.5 | 0.8 | 0.6 | 0.5 |
| Breaking Point | no | no | joint part | joint part | joint part | joint part |

In No.24*, due to insufficient thickness of the Ti-layer, In No.25*, due to too high temperature of heating the butted faces, in No.26*, due to a short holding time, and in No.27*, due to low pressure, the results were all dissatisfactory.

Example 7

Also, bonding of butting pattern "C-1" was carried out. As the Ti-alloy members round rods having a diameter 20 mm made of Ti-5Al-2Cr-1Fe were used. The Ti-layers for bonding were formed by spattering to thickness 5 μm. Heating was done in a tube furnace. The operating conditions and the test results are shown in Table 7.

TABLE 7

|  | No. 28 | No. 29* |
|---|---|---|
| Temperature (°C.) | 950 | 950 |
| Atmosphere | He | Ar |
| $N_2$ (vol. %) | 0.01 | 0.10 |
| $O_2$ (vol. %) | 0.01 | 0.01 |
| Pressure (MPa) | 10 | 10 |
| Period (min.) | 5 | 5 |
| Tensile Strength Ratio | 1.0 | 1.0 |
| Breaking Point | mother member | mother member |
| Bending Strength Ratio | 1.0 | 0.8 |
| Breaking Point | no | joint part |

In No.29*, the joint part was brittle due to $N_2$ gas in the atmosphere.

Example 8

Bonding of butting patterns "C-2" and "C-3" were carried out. The Ti-alloy members were made of Ti-3Al-2V for No. 30 and No.31, and Ti-6Al-4V for No.32. Heating was done by high frequency induction in vacuum ($10^{-4}$ Torr). The operation conditions and the test results are shown in Table 8.

TABLE 8

|  | No. 30 | No. 31 | No. 32 |
|---|---|---|---|
| Butting Pattern | C-2 | C-3 | C-3 |
| Ti-layer (μm) | 5 | 5 | 3 |
| Method of Forming | Ion Plating | Vapor Deposition | Ion Plating |
| Frequency (kHz) | 3 | 3 | 50 |
| Temperature (°C.) | 900 | 900 | 920 |
| Pressure (MPa) | 10 | 10 | 10 |
| Period (min.) | 5 | 5 | 5 |
| Tensile Strength Ratio | 1.0 | 1.0 | 1.0 |
| Breaking Point | mother member | mother member | mother member |
| Bending Strength Ratio | 1.0 | 1.0 | 1.0 |
| Breaking Point | no | no | no |

All the runs were successful.

Example 9

Modified butting patterns of "B-1", "B-2", "C-2" and "C-3", namely, patterns in which butting faces incline 45° to the direction of pressure, were tried. Ti-alloy members were round rods of diameter 20 mm made of Ti-6Al-4V. Heating was done by high frequency induction at 3 kHz under vacuum ($10^{-4}$ Torr). The operating conditions and the test results are shown in Table 9.

TABLE 9

|  | No. 33 | No. 34 | No. 35 | No. 36 |
|---|---|---|---|---|
| Butting Patterns | Mod. B-1 | Mod. B-2 | Mod. C-2 | Mod. C-3 |
| Ti-layer (μm) | 5 | 1 | 5 | 5 |
| Method of Formation | Vapor Deposition | Spattering | | Ion Plating |
| Temperature (°C.) | 950 | 950 | 950 | 950 |
| Pressure (MPa) | 10 | 5 | 10 | 15 |
| Period (min.) | 4 | 3 | 5 | 5 |
| Tensile Strength Ratio | 1.0 | 1.0 | 1.0 | 1.0 |

TABLE 9-continued

|  | No. 33 | No. 34 | No. 35 | No. 36 |
|---|---|---|---|---|
| Breaking Point | mother member | mother member | mother member | mother member |
| Bending Strength Ratio | 1.0 | 1.0 | 1.0 | 1.0 |
| Breaking Point | no | no | no | no |

All the bonding were satisfactory.

We claim:

1. A method of bonding Ti-alloy members comprising: butting two Ti-alloy members to be bonded with insertion of a Ti-sheet of thickness 500 μm or less between the butted faces of the members; heating the butted faces to a high temperature near but lower than the transformation temperature of the Ti-alloy, in a non-oxidizing atmosphere, while applying pressure of 5 MPa or higher to the butted faces; and holding the members for a period of 3 minutes or longer.

2. A method of bonding Ti-alloy members comprising: forming a Ti layer of a thickness of 1 μm or more at least one of the two ends of the two Ti-alloy members to be bonded; butting the faces of the two members; heating the butted faces to a high temperature near but lower than the transformation temperature of the Ti-alloy, in a non-oxidizing atmosphere, while applying pressure of 5 MPa or higher to the butted faces; and holding the members for a period of 3 minutes or longer.

3. A method of bonding Ti-alloy members comprising: butting two Ti-alloy members to be bonded with insertion of an intermediate member having Ti-layers of a thickness of 1 μm or more between the butted faces of the two members to be bonded; heating the butted faces to a high temperature near but lower than the transformation temperature of the Ti-alloy, in a non-oxidizing atmosphere, while applying pressure of 5 MPa or higher to the butted faces; and holding the members for a period of 3 minutes or longer.

4. A method of bonding Ti-alloy members according to claim 1 wherein the Ti-alloy contains an additive element or elements of group I below or additive elements of groups I and II below and the balance being substantially Ti:

I) 30% or less of one or more of Al up to 10%, V up to 25%, Sn up to 15%, Co up to 10%, Cu up to 10%, Ta up to 15%, Mn up to 10%, Hf up to 10%, W up to 10%, Si up to 0.5%, Nb up to 20%, Zr up to 10%, Mo up to 15% and O up to 0.1% (in case of two or more are added, in total); and II) a combination of 10% or less of one or more (in case of two or more are used, in total) of S 0.1–10%, Se 0.01–10% and Te 0.01–10%; and one or two of REM 0.01–10% and Ca 0.01–10% (in case of two are used, up to 10% in total).

5. A method of bonding Ti-alloy members according to claim 1 wherein the non-oxidizing atmosphere is an inert gas atmosphere in which $O_2$ and $N_2$ contents being both up to 0.01 vol. % at a normal or around normal pressure, or a vacuum under a pressure of $10^{-4}$ Torr or lower.

6. A method of bonding Ti-alloy members according to claim 1, wherein heating is carried out by high-frequency induction heating with a high-frequency electric power of 200 kHz or less.

7. A method of bonding Ti-alloy members according to claim 6, wherein the high-frequency induction heating is carried out under maintaining temperature of the ends to be heated by measuring the temperature of the heated ends and controlling imposed high-frequency electric power on the basis of the measured temperature.

8. A method of bonding Ti-alloy members according to claim 2, wherein the Ti-alloy contains an additive element or elements of group I below or additive elements of groups I and II below and the balance being substantially Ti:

I) 30% or less of one or more of Al up to 10%, V up to 25%, Sn up to 15%, Co up to 10%, Cu up to 10%, Ta up to 15%, Mn up to 10%, Hf up to 10%, W up to 10%, Si up to 0.5%, Nb up to 20%, Zr up to 10%, Mo up to 15% and O up to 0.1% (in case of two or more are added, in total); and II) a combination of 10% or less of one or more (in case of two or more are used, in total) of S 0.1–10%, Se 0.01–10% and Te 0.01–10%; and one or two of REM 0.01–10% and Ca 0.01–10% (in case of two are used, up to 10% in total).

9. A method of bonding Ti-alloy members according to claim 3, wherein the Ti-alloy contains an additive element or elements of group I below or additive elements of groups I and II below and the balance being substantially Ti:

I) 30% or less of one or more of Al up to 10%, V up to 25%, Sn up to 15%, Co up to 10%, Cu up to 10%, Ta up to 15%, Mn up to 10%, Hf up to 10%, W up to 10%, Si up to 0.5%, Nb up to 20%, Zr up to 10%, Mo up to 15% and O up to 0.1% (in case of two or more are added, in total); and II) a combination of 10% or less of one or more (in case of two or more are used, in total) of S 0.1–10%, Se 0.01–10% and Te 0.01–10%; and one or two of REM 0.01–10% and Ca 0.01–10% (in case of two are used, up to 10% in total).

10. A method of bonding Ti-alloy members according to claim 2, wherein the non-oxidizing atmosphere is an inert gas atmosphere in which $O_2$ and $N_2$ contents being both up to 0.01 vol. % at a normal or around normal pressure, or a vacuum under a pressure of $10^{-4}$ Torr or lower.

11. A method of bonding Ti-alloy members according to claim 3, wherein the non-oxidizing atmosphere is an inert gas atmosphere in which $O_2$ and $N_2$ contents being both up to 0.01 vol. % at a normal or around normal pressure, or a vacuum under a pressure of $10^{-4}$ Torr or lower.

12. A method of bonding Ti-alloy members according to claim 4, wherein the non-oxidizing atmosphere is an inert gas atmosphere in which $O_2$ and $N_2$ contents being both up to 0.01 vol. % at a normal or around normal pressure, or a vacuum under a pressure of $10^{-4}$ Torr or lower.

13. A method of bonding Ti-alloy members according to claim 8, wherein the non-oxidizing atmosphere is an inert gas atmosphere in which $O_2$ and $N_2$ contents being both up to 0.01 vol. % at a normal or around normal pressure, or a vacuum under a pressure of $10^{-4}$ Torr or lower.

14. A method of bonding Ti-alloy members according to claim 9, wherein the non-oxidizing atmosphere is an inert gas atmosphere in which $O_2$ and $N_2$ contents being both up to 0.01 vol. % at a normal or around normal pressure, or a vacuum under a pressure of $10^{-4}$ Torr or lower.

15. A method of bonding Ti-alloy members according to claim 2, wherein heating is carried out by high-frequency induction heating with a high-frequency electric power of 200 kHz or less.

16. A method of bonding Ti-alloy members according to claim 3, wherein heating is carried out by high-frequency induction heating with a high-frequency electric power of 200 kHz or less.

17. A method of bonding Ti-alloy members according to claim 4, wherein heating is carried out by high-frequency induction heating with a high-frequency electric power of 200 kHz or less.

18. A method of bonding Ti-alloy members according to claim 5, wherein heating is carried out by high-frequency induction heating with a high-frequency electric power of 200 kHz or less.

19. A method of bonding Ti-alloy members according to claim 8, wherein heating is carried out by high-frequency induction heating with a high-frequency electric power of 200 kHz or less.

20. A method of bonding Ti-alloy members according to claim 9, wherein heating is carried out by high-frequency induction heating with a high-frequency electric power of 200 kHz or less.

21. A method of bonding Ti-alloy members according to claim 10, wherein heating is carried out by high-frequency induction heating with a high-frequency electric power of 200 kHz or less.

22. A method of bonding Ti-alloy members according to claim 11, wherein heating is carried out by high-frequency induction heating with a high-frequency electric power of 200 kHz or less.

23. A method of bonding Ti-alloy members according to claim 12, wherein heating is carried out by high-frequency induction heating with a high-frequency electric power of 200 kHz or less.

24. A method of bonding Ti-alloy members according to claim 13, wherein heating is carried out by high-frequency induction heating with a high-frequency electric power of 200 kHz or less.

25. A method of bonding Ti-alloy members according to claim 14, wherein heating is carried out by high-frequency induction heating with a high-frequency electric power of 200 kHz or less.

* * * * *